(12) United States Patent
Halstead (10) Patent No.: US 10,122,238 B2
(45) Date of Patent: Nov. 6, 2018

(54) FLUID FLOW POWER GENERATION SYSTEM (71) Applicant: Empire Magnetics Inc., Rohnert Park, CA (US)

(72) Inventor: Richard Halstead, Rohnert Park, CA (US)

(73) Assignee: EMPIRE MAGNETICS INC., Rohnert Park, CA (US)

( * ) Notice: Subject to any disclaimer, the term of this patent is extended or adjusted under 35 U.S.C. 154(b) by 228 days.

(21) Appl. No.: 14/399,290

(22) PCT Filed: May 8, 2013

(86) PCT No.: PCT/US2013/040201
§ 371 (c)(1),
(2) Date: Nov. 6, 2014

(87) PCT Pub. No.: WO2013/169943
PCT Pub. Date: Nov. 14, 2013

(65) Prior Publication Data
US 2016/0111936 A1 Apr. 21, 2016

Related U.S. Application Data (60) Provisional application No. 61/644,244, filed on May 8, 2012, provisional application No. 61/776,193, filed on Mar. 11, 2013.

(51) Int. Cl.
*H02K 7/11* (2006.01)
*H02K 7/104* (2006.01)
(Continued)

(52) U.S. Cl.
CPC ............... *H02K 7/11* (2013.01); *F03D 9/255* (2017.02); *F03D 15/00* (2016.05); *H02K 7/183* (2013.01);
(Continued)

(58) Field of Classification Search
CPC ......... F03D 15/00; F03D 9/003; H02K 17/42; H02K 49/04; H02K 7/11; H02K 7/1823;
(Continued)

(56) References Cited

U.S. PATENT DOCUMENTS 3,955,097 A * 5/1976 Hobo ................. H02P 29/0027
290/40 R
4,048,528 A * 9/1977 Whitney ................. H02K 1/30
310/54
(Continued)

FOREIGN PATENT DOCUMENTS

KR 10-2009-0103030 A 10/2009
KR 10-2011-0084562 A 7/2011
KR 10-2011-0114277 A 10/2011

OTHER PUBLICATIONS

KIPO International Search Report in PCT/US2013/040201, dated Aug. 23, 2013.
(Continued)

*Primary Examiner* — Tulsidas C Patel
*Assistant Examiner* — S. M.
(74) *Attorney, Agent, or Firm* — Edward S. Sherman (57) ABSTRACT

A wind turbine rotary shaft is coupled to the rotary axis of a grid connected generator/alternator by magnetic means to feed power to the grid at all rotation speeds of the turbine shaft that exceed the generator speed when it acts as a motor power by the grid. The coupling is a generally circular first plate having a magnet array at the end of the generator shaft. The rotary axis of a turbine is likewise connected to a second generally circular plate. The second plate is electrically conductive, but not magnetic and is offset but adjacent to the first plate. When the turbine shaft is turning faster than the generator shaft more power is fed into the grid by the generator/alternator.

25 Claims, 10 Drawing Sheets (51) Int. Cl.
  *H02K 7/18* (2006.01)
  *H02K 49/04* (2006.01)
  *F03D 15/00* (2016.01)
  *F03D 9/25* (2016.01)
  *H02K 17/42* (2006.01)

(52) U.S. Cl.
  CPC ........... *H02K 7/1823* (2013.01); *H02K 49/04* (2013.01); *F05B 2220/70644* (2013.01); *F05B 2260/404* (2013.01); *H02K 17/42* (2013.01); *Y02E 10/725* (2013.01)

(58) Field of Classification Search
  CPC ........... H02K 7/183; F05B 2220/70644; F05B 2260/404; Y02E 10/722; Y02E 10/725
  See application file for complete search history.

(56) References Cited

U.S. PATENT DOCUMENTS

| | | | | |
|---|---|---|---|---|
| 4,421,967 | A * | 12/1983 | Birgel | F03D 9/006 219/618 |
| 4,627,583 | A * | 12/1986 | Huemer | B65H 59/385 242/413.8 |
| 5,477,093 | A * | 12/1995 | Lamb | H02K 49/046 310/75 D |
| 5,477,094 | A * | 12/1995 | Lamb | H02K 49/046 310/105 |
| 5,668,424 | A * | 9/1997 | Lamb | H02K 49/046 192/40 |
| 6,998,723 | B2 * | 2/2006 | Kong | H02K 7/1807 290/1 C |
| 7,068,015 | B1 | 6/2006 | Feddersen | |
| 8,319,365 | B2 * | 11/2012 | Hemmelmann | F03D 7/0276 290/44 |
| 2005/0169742 | A1 | 8/2005 | Kane | |
| 2009/0200883 | A1 | 8/2009 | Halstead | |
| 2009/0295250 | A1 | 12/2009 | Nakanishi et al. | |
| 2010/0032995 | A1 | 2/2010 | Hatch et al. | |
| 2010/0176674 | A1 | 7/2010 | Post | |
| 2011/0037333 | A1 * | 2/2011 | Atallah | H02K 51/00 310/98 |
| 2011/0042965 | A1 * | 2/2011 | Atallah | H02K 49/102 290/1 C |
| 2011/0266903 | A1 | 11/2011 | Hara | |
| 2012/0098374 | A1 * | 4/2012 | Curbelo | H02K 49/106 310/103 |
| 2013/0320681 | A1 * | 12/2013 | Karmaker | H02K 49/102 290/55 |
| 2014/0346777 | A1 * | 11/2014 | Blanchet | H02K 5/12 290/54 |

OTHER PUBLICATIONS

Kubzdela et al., Magnetodielectrics in Induction Motots With Disk Rotor, IEEE Trans. of Magnetics, vol. 24, No. 1, Jan. 1988, p. 635-638.

Mirzaei et al., Analytical Modeling of Axial Air Gap Solid Rotor Induction Machines Using a QUI-Three-Dimension Method, IEEE Trans. of Magnetics, vol. 43, No. 7, Jul. 2007, p. 3237-3242.

Esposito et al., "Electromagnetic Analysis of an Induction Motor With Massive Disk", IEEE Trans. of Magnetics, vol. 31, No. 3, May 1995, p. 2076-2079.

Retrieved from "https://en.wikipedia.org/w/index.php?title=Lenz%27s_law&oldid=795953021".

Operation and Maintenance of Large Turbo Generators, by Geoff Klempner and Isidor Kerszenbaum, Chapter 1.John Wiley & Sons, 2004 (Klempner Treatise).

Retrieved from "https://en.wikipedia.org/w/index.php?title=Eddy_current_brake&oldid=795959230".

* cited by examiner

FLUID FLOW POWER GENERATION SYSTEM

CROSS REFERENCE TO RELATED APPLICATIONS

The present application claims the benefit of priority to the PCT patent application filed with the US PTO as the Receiving Office having an International filing date of May 8, 2013, having been assigned PCT/2013/04201.

The present application also claims the benefit of priority to the US Provisional patent application of the same title that was filed on May 8, 2012, having application Ser. No. 61/644,244 and is incorporated herein by reference. The present application also claims the benefit of priority to the US Provisional patent application of the same title that was filed on Mar. 11, 2013, having application Ser. No. 61/776,193 and is also incorporated herein by reference.

BACKGROUND OF INVENTION

The present invention relates to the generation of electric power from wind driven or other variable speed fluid driven turbines.

There are various means to transfer the power generated by variable speed turbines to a utility electric grid. AC-DC conversion of a directly coupled generator allows more power to be generated when the wind blows harder.

However, as this method is proportionately much more expensive for very large turbines, it has been preferable to deploy direct energy feed to the electric grid, by running the generator at constant speed. However, since winds speed vary, and turbine speeds are mismatched to generator speeds; in practice, a gear transmission is deployed between the wind turbine and the generator drive train to match the generator speed to achieve the grid frequency. To maintain the generator speed to a fixed value turbine speed control is achieved by rotating the airfoils to reduce the angle of attack as the wind speed increases. Both methods have their own issues with the reliability, equipment cost, wear and as well as the increased cost and maintenance of such moving parts.

Further, such methods limit the potential to harvest the full power potentially availed from the wind, and result in a compromise at which potentially lower but still useful power is not used when the wind speed is too low, and higher power is given up for those opportunities with higher than average wind speeds.

Hence, ideal locations for wind turbines are sites at which the wind constantly blows at a high speed, without significant lulls, or speed variations.

These compromises generally lead to the establishment of large scale turbine wind farms at limited location that generally have a high constant wind speed, and hence preclude a more economic generation of power for local user needs, which avoids the investment in a large transmission line infrastructure.

Accordingly, it would be advantageous to provide as a first object of this invention a means for direct transmission or AC generator power to an AC grid without intermediate DC conversion.

It is hence another object of the invention to achieve such direct conversion without a mechanical transmission and without compromising the energy potential of a particular wind turbine site to a fixed wind speed.

SUMMARY OF INVENTION

In the present invention, the first object is achieved by providing a fluid flow generation system comprising a fluid driven rotary turbine blade assembly, a first rotary shaft having a rotary coupling to said rotary turbine blade assembly, a first conductive plates orthogonally coupled to said first rotary shaft, an electric dynamo machine (EDM) having a rotary axle, wherein the EDM is energized by an electric power grid to run at a constant rotary speed, at least one of a second plate coupled to rotate in the plane thereof to the rotary axle, the second plate having disposed parallel to the plane thereof an array of permanent magnets, each magnet in the array having the north and south poles thereof oriented toward opposing sides of the plate, wherein for each magnets in the arrays the north and south poles are at the opposite axial orientation with respect to the immediately adjacent magnets in the array, wherein the first and second plates are disposed proximal to each other such than a rotary speed of the first rotary shaft in excess of the constant rotary speed will cause the EDM to generate more power into the electric grid than is consumed by its rotation at the constantly rotary speed.

A second aspect of the invention is characterized in that the EDM is de-energized from the electric grid when the first rotary shaft drops below the constant rotary speed of the EDM set by the electric grid.

Another aspect of the invention is characterized in the first rotary shaft and the rotary axle of the EDM are laterally offset from each other and the first conductive plates has a larger diameter than the second plate.

Another aspect of the invention is characterized in the first rotary shaft and the rotary axle of the EDM are laterally offset from each other.

Another aspect of the invention is characterized in the system also comprises a third plate having disposed parallel to the plane thereof an array permanent magnets, each magnet in the array having the north and south poles thereof orient about the coupling to the rotary axle, wherein magnets in the array the north and south poles at the opposite axial orientation with respect to the immediately adjacent magnets in the array, and the second and third plate are deployed on opposite sides of the first conductive plate.

The above and other objects, effects, features, and advantages of the present invention will become more apparent from the following description of the embodiments thereof taken in conjunction with the accompanying drawings.

DETAILED DESCRIPTION

Referring to FIGS. 1 through 10B, wherein like reference numerals refer to like components in the various views, there is illustrated therein a new and improved wind turbine generation system, generally denominated 100 herein.

Figure 1:
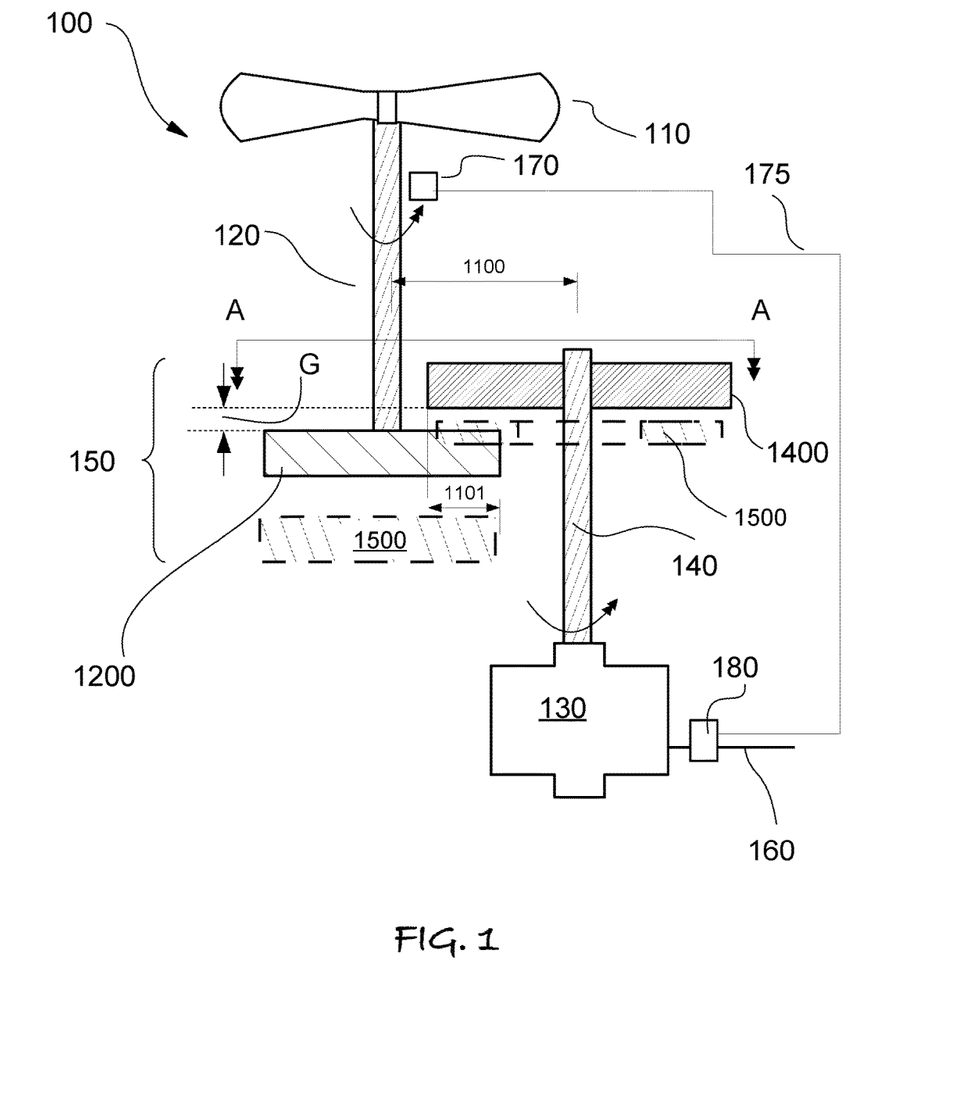
FIG. 1 is a schematic cross-sectional elevation of the transmission in a turbine power generation system activated by flowing fluid, such as wind, such as tidal flows and surges.
Figure 2:
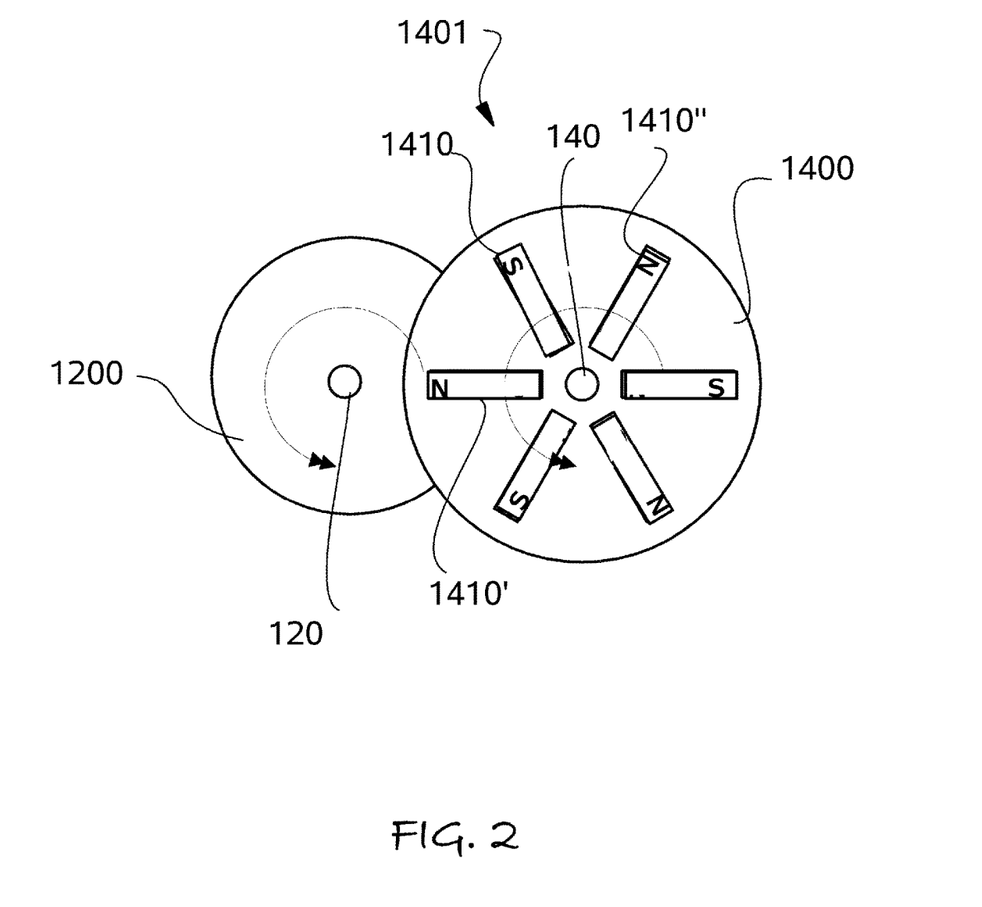
FIG. 2 is a plan view of the transmission at section line A-A in FIG. 1

In accordance with the present invention wind or fluid flow turbine generation system 100 has turbine blades 110 that are coupled directly to a turbine rotary shaft 120, which can be supported with various types of rotary bearings (not shown) such that force of wind currents or other fluid flow on the turbine blades 110 causes the rotation of rotary shaft 120. System 100 also has a generator/alternator type dynamo-electromagnetic machine 130, which is activated to produce power (in the generator mode) when its rotary shaft 140 is turned. A non-contact transmission means 150 transforms the potential energy from the turning of turbine shaft 120 to an electric power output produced by the generator 130, which is delivered to an electric power transmission grid 160. This transmission means 150 has a magnet supporting plate or rotor 1400 attached to the end of the generator rotary shaft 140, with the plate axis disposed orthogonal to the primary axis of shaft 140. Plate 1400 is preferably circular and supports a permanent magnet array 1401. The permanent magnets 1410 of this array 1401 are generally bar or wedge shaped, and arrayed as spokes or circumferentially, that is arrayed on the disk shaped magnet supporting plate 1400 with a principal axis of each magnet disposed in the radial direction of the plate, but with alternating polarity between each immediately adjacent magnet 1410 as shown in FIG. 2. Thus magnet 1410 has the south pole (S) at facing upward with adjacent magnets 1410' and 1410" having their north poles (N) facing upward. The transmission means also has a conducting plate 1200 that is electrically conductive and is likewise disposed with the plate's primary axis (in the plane of the plate) at an orthogonal orientation to the end of rotary shaft 120, which is driven by turbine blades 110. Further, the magnet supporting plate 1400 and the conducting plate 1200 are disposed adjacent and parallel to each other, but not in physical contact, to provide an electro-magnetic interaction of the fields of the magnetic array to generate a current flow in the electrically conductive disk or plate 1200. In this embodiment the rotary shafts 120 and 140 are laterally offset to provide a horizontal offset (denoted 1100) of the shafts with plate or disks 1200 and 1400 having a horizontally overlapping region (denoted 1101). Further, there is a vertical or axial gap (denoted G) between plates 1400 and 1200, as shown on FIG. 1.

It should be appreciated that plates 1400 and 1200, while not making physical contact, are sufficiently close that the magnets 1410, when rotating relative to plate 1200, generate a flowing/circulating electric current therein.

The generator/alternator 130 is initially operating as a motor at a fixed speed set by its connection to a power grid 160 (via the grid operating frequency), that is as a synchronous or AC induction motor. Hence, the circulating magnetic field variation produced by the rotating magnetic plate 1400 is fixed by its rotation speed, which is determined by the electric grid frequency. The magnetic plate 1400 or conductive plate 1200 is optionally supported by one or more bearings, which are preferably a magnetic bearing, such as that disclosed in U.S. Pat. No. 7,821,168 (which issued to R. Halstead on Oct. 26, 2010), which is incorporated herein by reference.)

However, when the conductive plate 1200 rotates faster than fixed speed of shaft 140, a reactive magnetic field is produced by the current induced in the conductive portion of the conductive plate 1200. This increased reactive magnetic field is a result of the differential speed of the conductive plate 1200 over the fixed speed of magnet supporting plate 1400, and does not induce the generator/alternator 130 to rotate faster. However, this differential speed results in an increased phase lead from the grid frequency. As the phase lead increases, a larger active current is produced in the stator coils of the generator/alternator 130, sending increasing power back to the electric grid 160. Hence, the coupling means 150 results in the generation of power that is transmitted to grid 160 when the wind or driving fluid acting on blades 110 spins shaft 120 faster than the fixed speed of shaft 140.

As generator 130 would actually consume power when operating at a grid determinative speed that is faster than the wind generated speed of disk 120, another aspect of the invention is the deployment of a sensing means 170 to determine this condition, and then shut off grid power to the generator 130 via switch 180. This sensing means 170 can be a rotary speed sensor on the shaft of rotary shaft 120. A circuit 175 leads from sensing means 170 to the switch 180 to disconnect the electric grid 160 from generator 130 when the speed is below a predetermined rate that would be insufficient to generate power into the electric grid. Hence, the sensing means 170 is operative to disconnect the EDM from the grid power when the rotation speed of the turbine blade assembly is insufficient to generate more power than is consumed by energizing the EDM to rotate at constant speed.

Figures 3A, 3B:
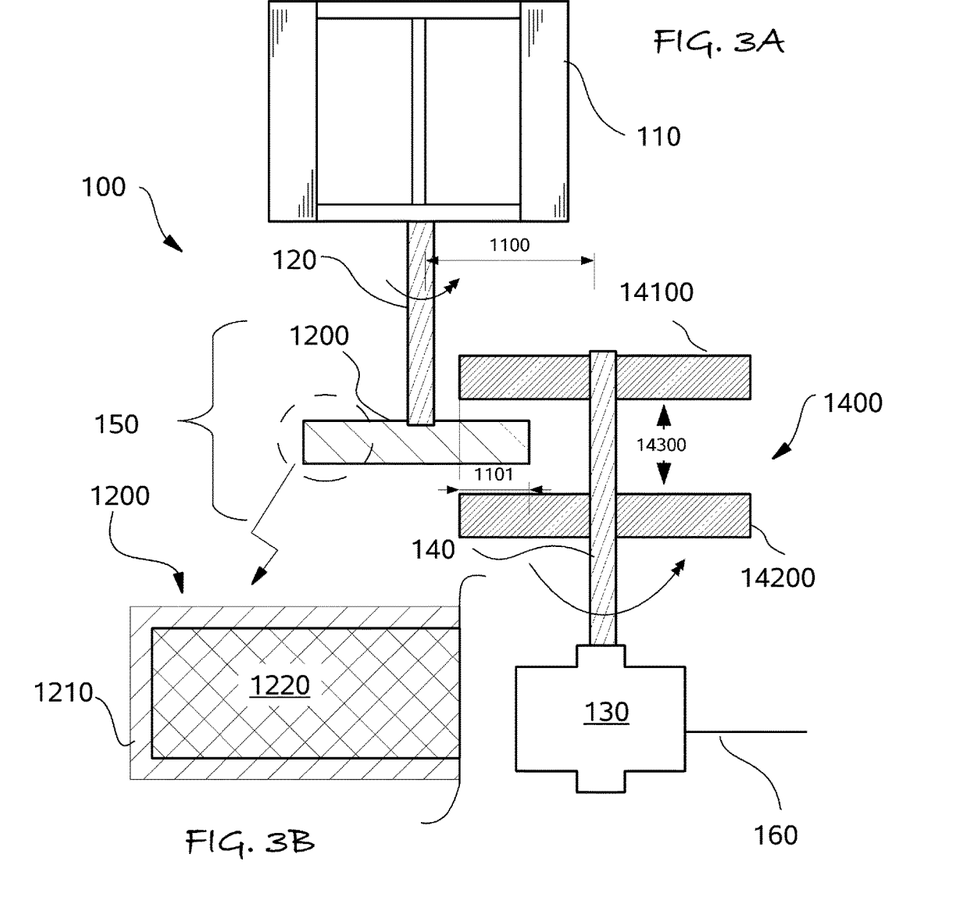
FIG. 3A is a schematic cross-sectional elevation of the transmission in another embodiment of the power generation system.
FIG. 3B is an expanded view of the portion of the transmission shown in FIG. 3A.

In more preferred embodiments, such as in FIG. 3A, the conductive plate 1200 has a larger diameter to the diameter of magnet supporting plate 1400 to provide an effective gear ratio to increase the alternator speed even when the turbine is rotating slower than the synchronous speed of the EDM, which is essentially an AC induction alternator. As a non-limiting example with 60 Hz. frequency the shaft of the EDM may rotate at 1800 rpm for a 4 pole alternator, while the wind turbine may be designed to operate at only 250 rpm. In this case the conductive disk or plate 1200 should have a diameter or radius ratio of greater than 1800/250, or about greater than about 7.2 with respect to the magnet supporting disk or plate 1400 provide the speed differential that generates power.

In a more preferred embodiment of the invention, illustrated in FIG. 3A, the magnet supporting plate 1400 is configured to have a first and second disk portion 14100 and 14200 that vertically straddle conductive plate 1200, as shown in FIG. 3, in which the overlapping portion 1101 of conductive plate 1200 is disposed with gap 14300 formed between disks 14100 and 14200. Each of these disks has a similar magnetic array to 1401, shown in FIG. 2, but oriented to face disk 1200 and produce a symmetric magnetic field therein. It is additionally preferred to deploy with this embodiment a conductive disk or plate 1200 with a greater diameter than the magnet supporting disk or plate 1400, and also to deploy the sensing means 170 discussed with respect to FIG. 1 to disconnect the electric grid 160 from generator 130 when the speed is below a predetermined rate. of about 250 rpm.

In another more preferred aspect and embodiment of the invention, illustrated in FIG. 3B, the conducting plate 1200 has a conductive non-ferromagnetic skin 1210 and a ferromagnetic core 1220. This skin is preferably aluminum, or another good conductor of electricity and the core 1220 is provided to reduce the circulating current radially in the core of the plate 1200, thus concentrating current in the skin 1210 to provide a greater reactive magnetic force on rotor 1400.

Figure 4A:
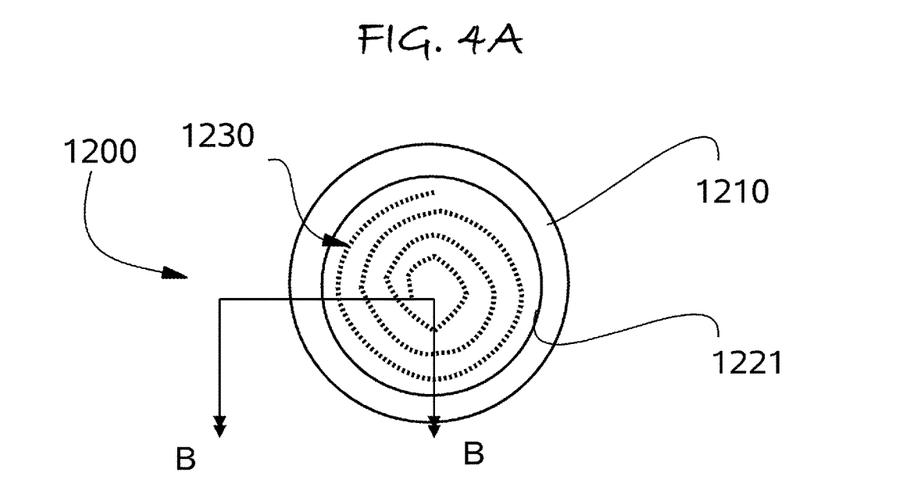
FIG. 4A is a plan view of a preferred embodiment of the disk, whereas FIG. 4B cross-sectional elevation view thereof taken at section line B-B in FIG. 4A.

The ferromagnetic core 1220 is preferably formed by coiling a pliable ferromagnetic metal bar 1221, such as an iron bar, upon itself, as shown in FIG. 4A. The coil lies in the primary plane of the plate, having a coil axis coincident with the rotary axis. More preferably, the iron or ferromagnetic bar has an electrically insulating layer on one surface, such that when coiled, there will be an insulating layer to prevent current from flowing radially in the conductive plate but for the conductive surface skin over the ferromagnetic core.

Figure 4B:
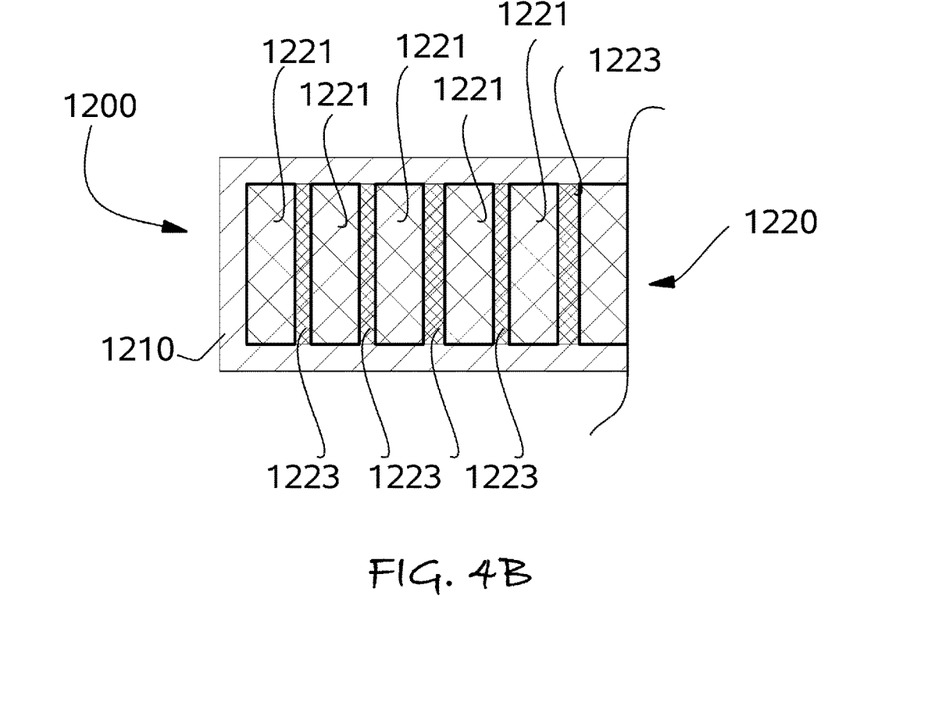

The coiled metal bar 1221 is then encapsulated in an aluminum skin 1210, as shown in section view in FIG. 4B, to form disk 1220 which is attached to the end of shaft 120. An electrically insulating layer 1223 is provided on each side overlap in the wrapping of the metal bar 1221 such that an electric current in bar 1221 cannot flow transverse to the coiled plate 1230 that forms core 1220. The electrical insulation can be formed by adding a dielectric coating, such as silicone or other rubbers, or alternatively forming a dielectric conversion coating on the metal, such as nitrites, oxides and phosphates by well known conversion coating methods.

In the case of using aluminum metal for the skin 1210, the skin thickness can be optimized by computer modeling, and current channels may be formed to enhance efficiency. The core 1200 thickness may be selected for both magnetic properties and mechanical properties; we have found ½" (12 mm) to be a functional, but not exclusive dimension. Although the optimum skin to core ratio depends of the conductance of the metal skin, and the nature of the ferromagnetic core, and the mechanical forces upon the equipment, for small unit that have been tested the total core thickness is about twice the skin thickness. Hence, what is currently a preferred value for the skin thickness and core thickness is likely to change with different physical dimensions and power output levels. It may additionally be desirable to form the conductive skin with a variation in thickness to limit current flow across thin areas, such as pattern imposed via casting, stamping or other methods where the purpose of the pattern is to increase the efficiency of the device.

It should also be noted that while FIG. 2 illustrates the turbine is a Vertical Axis Wind Turbine (VAWT), that is with the turbine axis is vertical, the invention is applicable to other means of variable speed fluid sources, such as winds, tides and the like. However, the deployment of the system with a VAWT is a preferred embodiment; as such turbines readily spin over a wide range of wind speeds to constantly produce at least some power.

Figure 5:
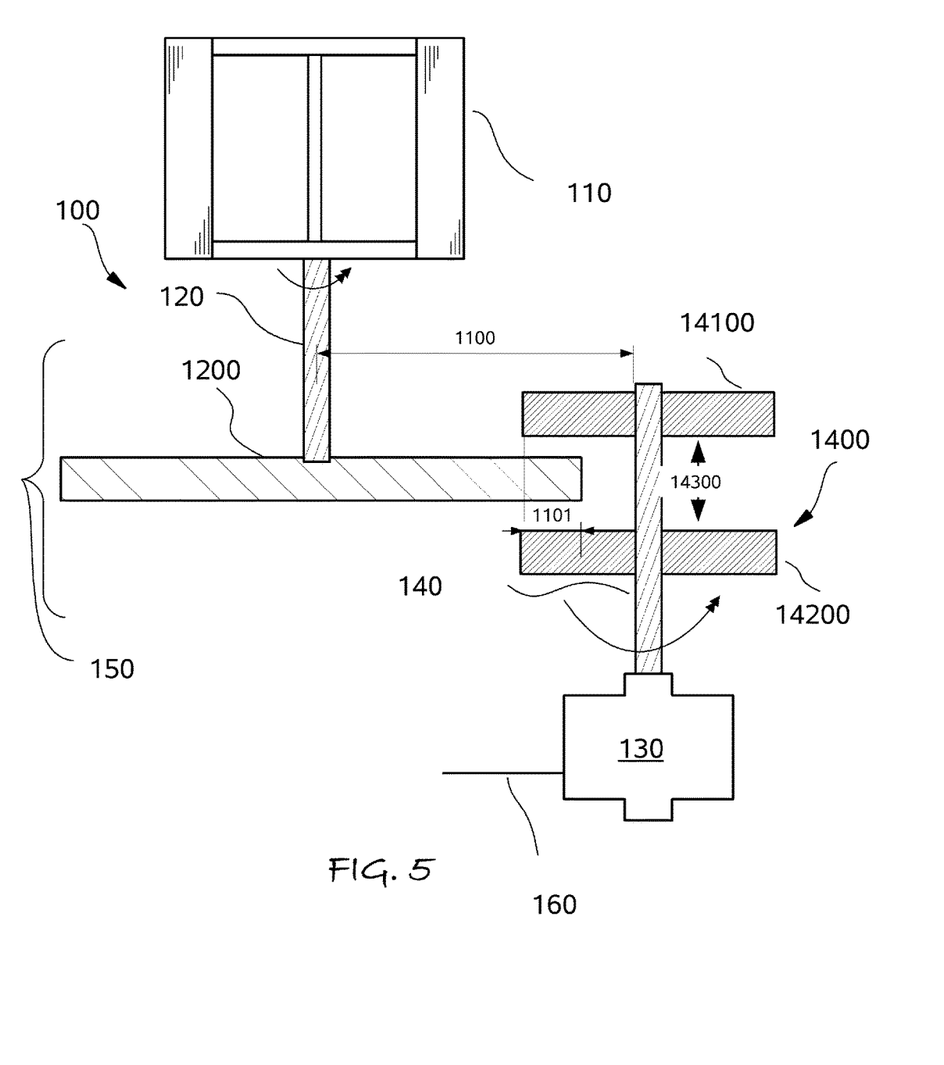
FIG. 5 is a schematic cross-sectional elevation of the transmission in another embodiment of the power generation system.

In another embodiment of the transmission and turbine system 100, illustrated in FIG. 5, the conducting plate 1200 has a larger diameter than the magnet supporting plate 1400 that supports a permanent magnet array to provide a nominal differential gear ratio between the rotation rate of the turbine 110 and the alternator/generator 130.

Figure 6:
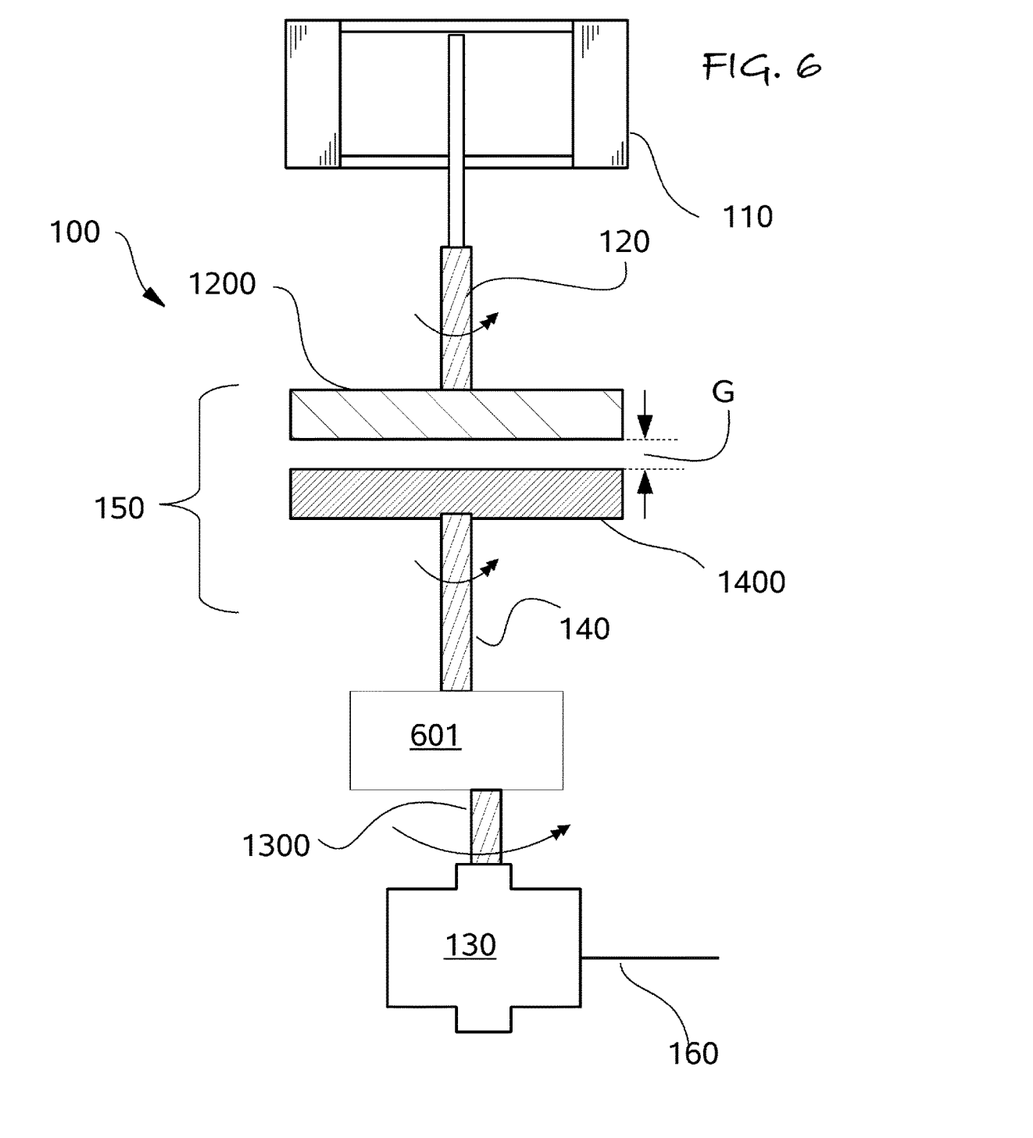
FIG. 6 is a schematic cross-sectional elevation of the transmission and related components in another embodiment of the power generation system.
Figure 7:
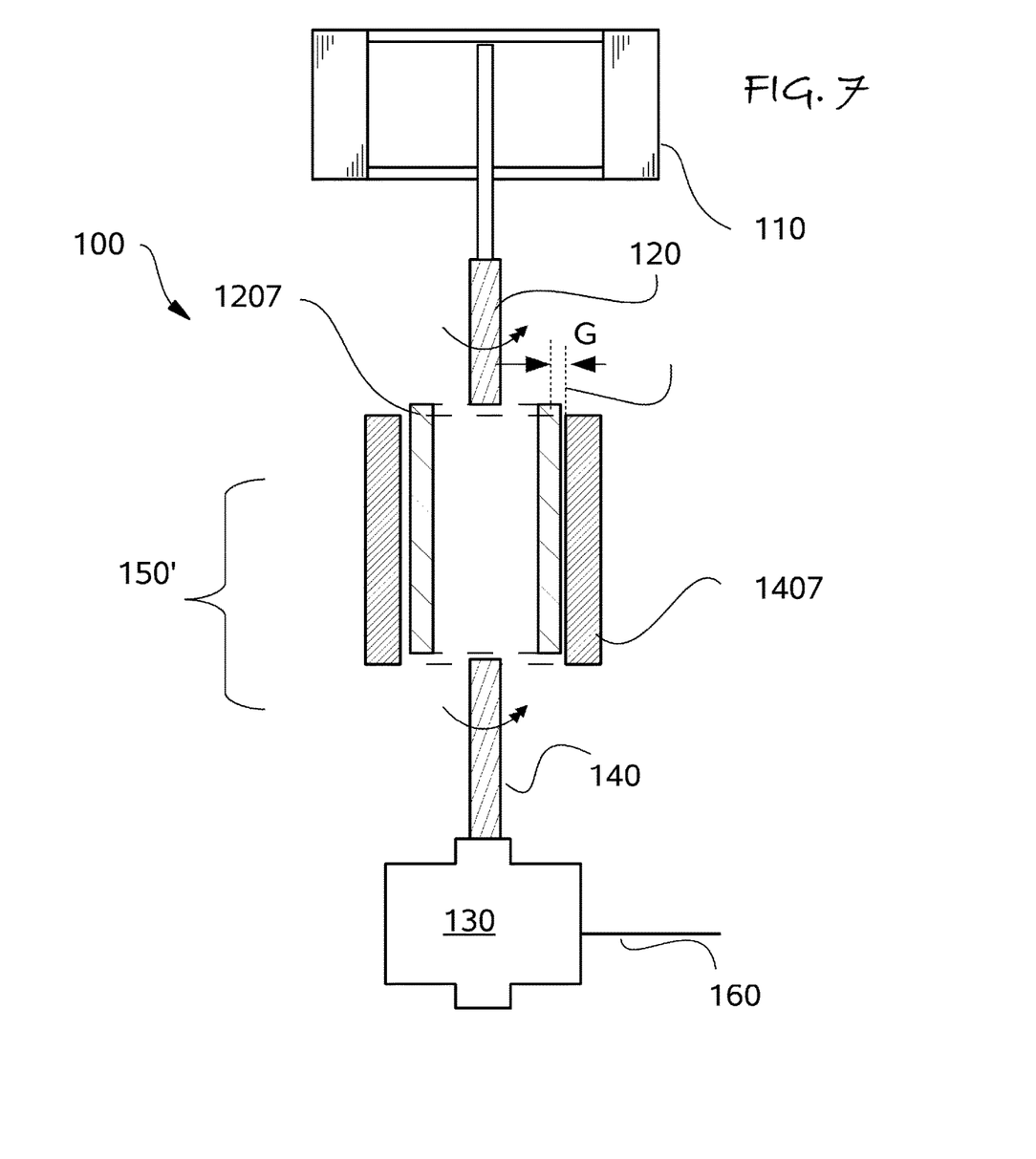
FIG. 7 is a schematic cross-sectional elevation of the transmission in another embodiment of the power generation system.

In another embodiment of the transmission and turbine system 100, illustrated in FIG. 6, the rotary shafts 120 and 140 are not laterally offset, but are co-linear. A nominal differential gear ratio between the rotation rate of the turbine 110 and the alternator/generator 130 is provided by a mechanical transmission, denoted 601, that is disposed to couple the rotation of the shaft 140 to the alternator rotation axle 1300. There remains a vertical gap (denoted G) between plates 1400 and 1200, which have about the same diameter.

In the alternative embodiment of FIG. 7-10, the above inventive principles are deployed in a non-contact transmission means 150' comprises of coupled cylinders that interact across a radial gap, rather than plates that interact across an axial gap in the embodiments of FIG. 1-6.

Hence, the wind or fluid flow turbine generation system 100 has turbine blades 110 that are coupled directly to a turbine rotary shaft 120, which can be supported with various types of rotary bearings (not shown) such that force of wind currents or other fluid flow on the turbine blades 110 causes the rotation of rotary shaft 120. System 100 also has a generator/alternator type dynamo-electromagnetic machine 130, which is activated to produce power (in the generator mode) when its rotary shaft 140 is turned. A non-contact transmission means 150 transforms the potential energy from the turning of turbine shaft 120 to an electric power output produced by the generator 130, which is delivered to an electric power transmission grid 160. This transmission means 150 has a first cylinder 1407 attached to the end of the generator rotary shaft 140, with the cylindrical axis disposed parallel and co-linear with primary axis of shaft 140.

Figures 9A, 9B, 9C:
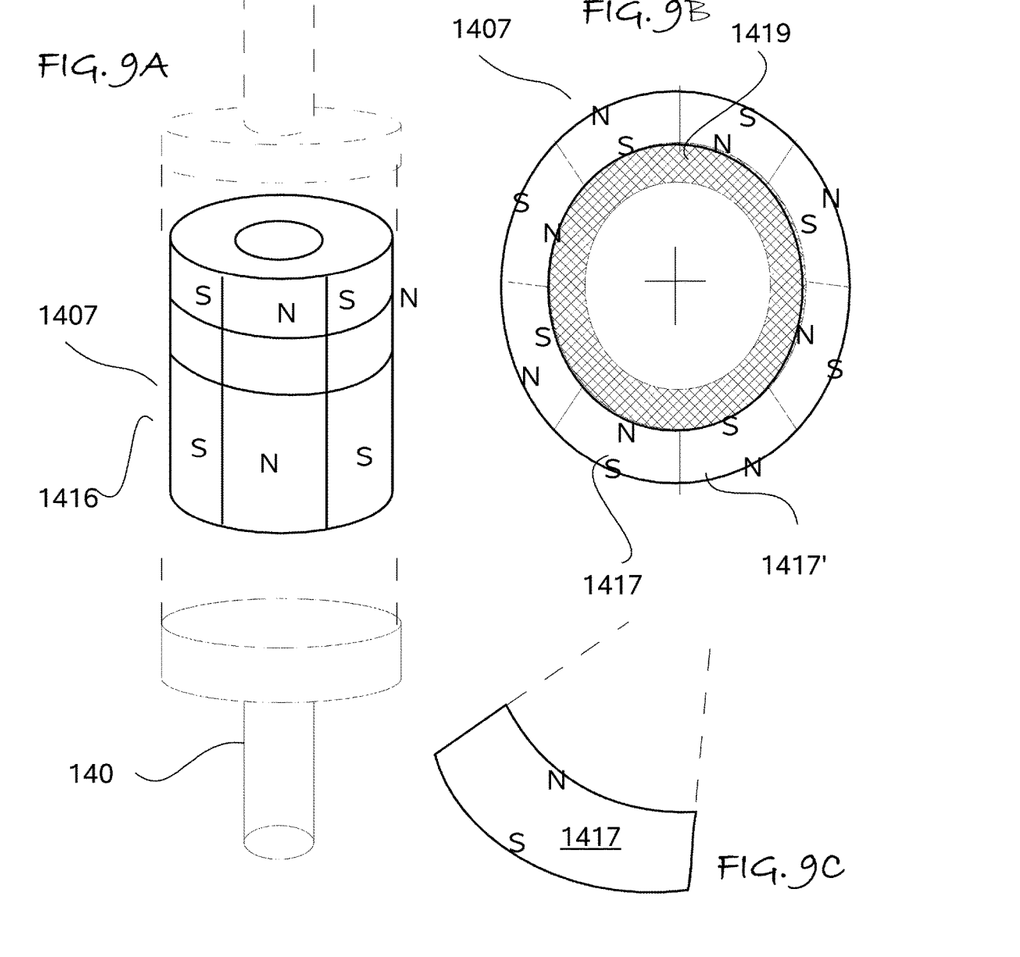
FIG. 9A-C illustrates in the respective exploded perspective view, plan sectional view and top plan view an embodiment of the magnetic structure of the cylinder in FIGS. 7 and 8.

Cylinder 1407 is or supports a permanent magnet array 1416, illustrated in FIG. 9A-C. It is preferable that the polarity of the magnetization is through the thin section of the magnets that form the outer surface of cylinder 1407. The permanent magnets 1417 of this array 1416 are radial arc segments arrayed about the perimeter of the cylinder 1407 with the North and South poles alternating between inward and outward facing orientation that is between the longer outer arc of the magnet, and the shorter inner arc. Thus magnet 1417 has a south pole (S) at the outer arc segment, while each adjacent magnets 1417', has the opposite pole orientation, with the north pole (N) at the outer arc segment, and the south pole (S) orientated with the shorter inner arc segment. The cylinder 1407 also preferably deploys a concentric annular ferrite core 1419 inside of the magnet array 1416. As illustrated in FIG. 9A, the magnets 1417 can range in dimensions from elongated or relatively flat with respect the axial direction thickness in relation to the radial width or thickness of the magnets that surround the core 1419.

The transmission means 150 also has a second cylinder 1207 that is electrically conductive and is likewise disposed with the cylinder primary axis parallel and co-linear with the rotary shaft 120, which is driven by turbine blades 110. Further, the first cylinder 1407 and the second cylinder 1207 are disposed concentrically with a small radial gap, G, to provide an electro-magnetic interaction of the fields of the magnetic array to generate a current flow in the electrically conductive cylinder 1207.

Figure 8:
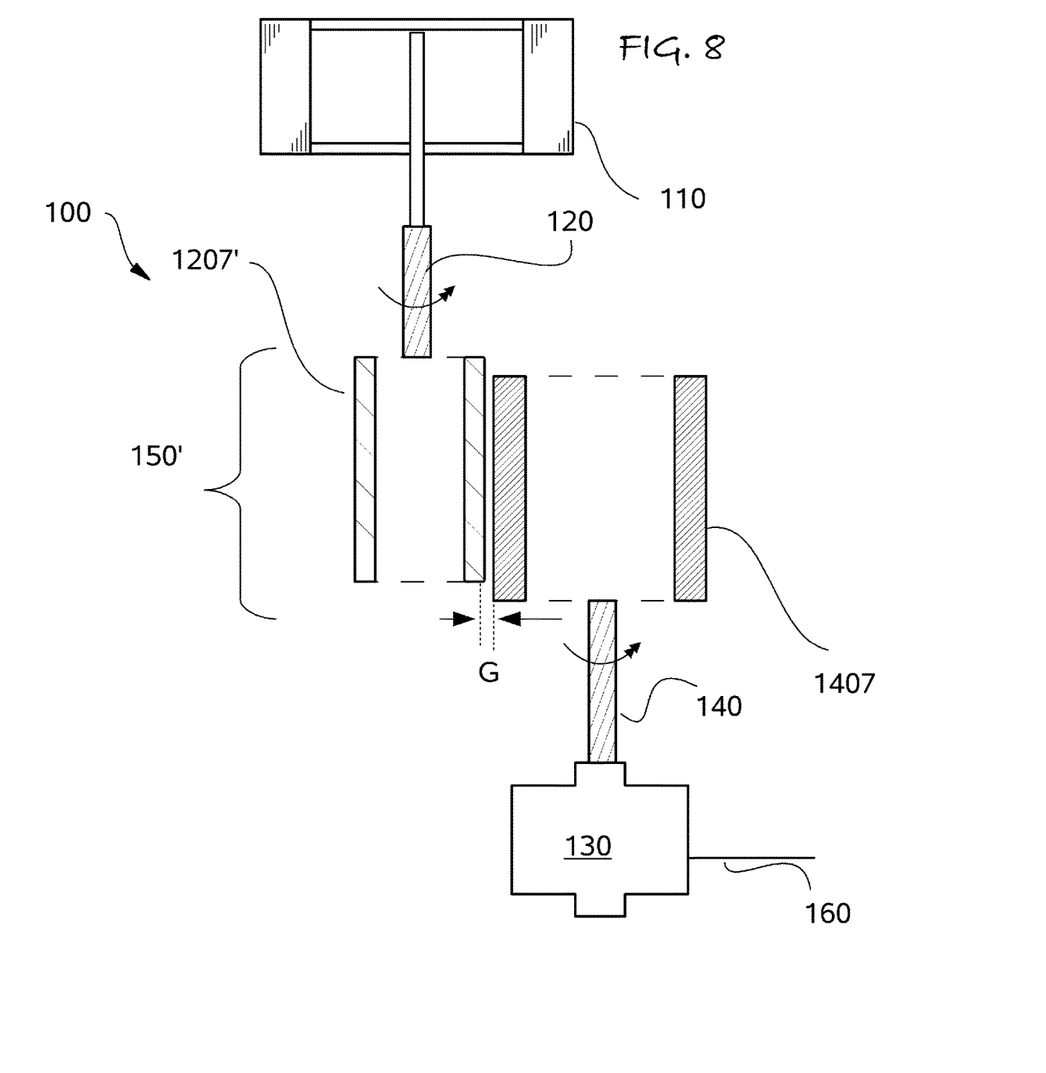
FIG. 8 is a schematic cross-sectional elevation of the transmission in another embodiment of the power generation system.

In the embodiment of FIG. 8, the cylinders 1207' and 1407 are no longer concentric, but arranged adjacent to each other so that the connected rotary shafts 120 and 140 are laterally offset. The diameter ratio of the cylinders provides an effective gear ratio. In FIG. 8, cylinder 1207' deploys the conductive skin 1210 on the outer surface, as shown in FIG. 10B, whereas in FIG. 7, cylinder 1207 deploys a conductive skin 1210' on the inner surface, in each instance, providing the conductive skin as close as possible to the magnets 147 in array 1416 of cylinder 1407.

Figure 10A:
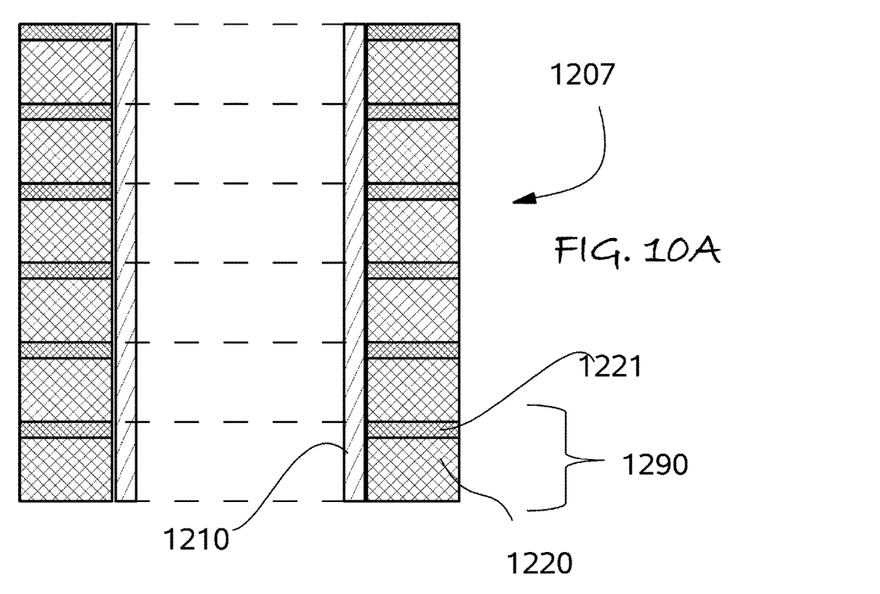
FIGS. 10A and 10B are cross-section elevations of the structure of a preferred embodiment of the conductive cylinders in the embodiments of FIGS. 7 and 8.
Figure 10B:
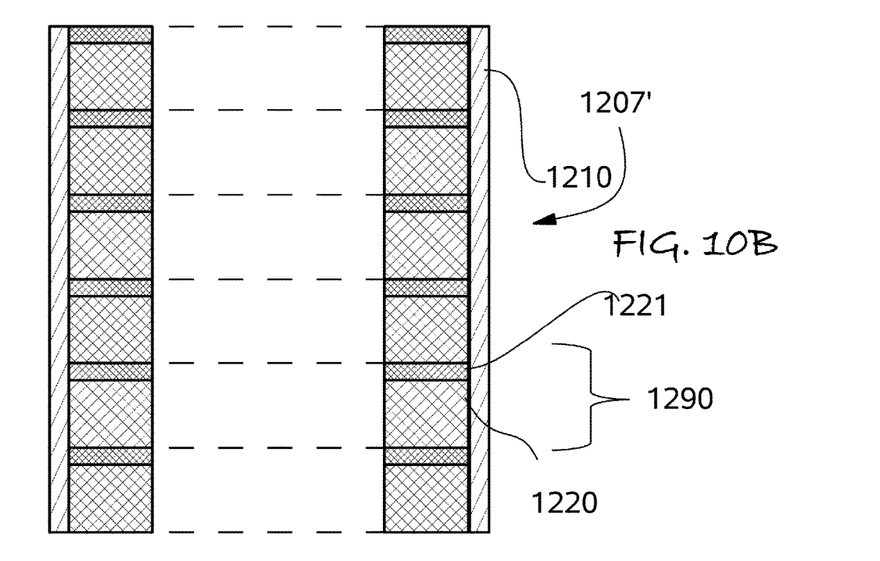

FIGS. 10A and 10B illustrate preferred embodiment of the cylinder 1207 and 1207' respectively. Similar to the embodiment of FIGS. 4A and 4B, the second cylinder 1207 has conductive non-ferromagnetic skin 1210 on at least one of the inside and outside, and a ferromagnetic core 1220. This skin is preferably aluminum, or another good conductor of electricity and the core 1220 is provided to reduce the circulating current in the plate 1200, as concentrating current in the skin 1210 provides a greater reactive magnetic force on rotor 1400.

The ferromagnetic core 1220 is preferably formed by providing a series of ferromagnetic metal washer shaped rings, and covering at least one of the top and bottom surface with an electrically insulating layer 1223, forming disks units 1290, which are stacked to form the cylinder 1207. The electrical insulation layer 1223 can be formed by adding a dielectric coating, such as silicone or other rubbers, or alternatively forming a dielectric conversion costing on the meal, such as nitrites, oxides and phosphates by well know conversion coating methods.

In the case of using aluminum metal for the skin 1210, the skin preferably has a total thickness of ¼" (6 mm) and the core 1200 preferably has a thickness of about ½" (12 mm). Although the optimum skin to core ratio depends of the conductance of the metal skin, and the nature of the ferromagnetic core the total core thickness is about twice the skin thickness. However, these currently preferred values of skin thickness, core thickness and skin to core ration are likely to change with different physical dimensions and power output levels.

It should be appreciated that concentric or adjacent cylinders 1407 and 1207, while not making physical contact, are sufficiently close that the magnets 1417, when rotating relative to conductive metal layer associated with cylinder 1207, generate a flowing/circulating electric current therein.

In summary, the various embodiments of the instant invention provide among other benefits mechanical reliability over transmission that deploy contact gears, simplicity over prior art magnetic gear transmissions, and more efficient wind energy harvesting over a wide range of wind conditions.

It should be understood that the inclusion of various optional features and aspects of the invention in one embodiment does not preclude their use in other and additional embodiments of the invention. Hence, while the invention has been described in connection with several preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A fluid flow power generation system comprising:
   a) a fluid driven rotary turbine blade assembly,
   b) a first rotary shaft having a rotary coupling to said rotary turbine blade assembly,
   c) a first electrically conductive plate having a principal plane, the first electrically conductive plate being coupled to said first rotary shaft to dispose the principal plane of the first electrically conductive plate orthogonal to said first rotary shaft,
   d) an electric dynamo machine (EDM) having a second rotary shaft, wherein the EDM is energized by an electric power grid to run at a constant rotary speed determined by a grid frequency,
   e) a second plate having a principal plane, the second plate being coupled to the second rotary shaft to dispose the principal plane of the second plate orthogonal to said second rotary shaft, the second plate having disposed parallel to the principal plane of said second plate an array of permanent magnets with a principal axis of each magnet disposed in a radial direction of said second plate with alternating polarity between each immediately adjacent magnet in the array, in which the magnets of the array are disposed about a circumference of the second plate,
   f) wherein the first and second plates are disposed spaced apart but sufficiently proximal to each other such when an increased differential speed of rotation of the first rotary shaft and the second rotary shaft results in an increased phase lead from the grid frequency the EDM is operative to send power back to the electric power grid.

2. The fluid flow power generation system according to claim 1 wherein the first rotary shaft and the second rotary shaft are laterally offset.

3. The fluid flow power generation system according to claim 2 wherein the first plate has a first thickness and the fluid flow power generation system further comprising:
   a) a third plate having a principal plane that is coupled to the second rotary shaft and disposed parallel to the second plate wherein the second plate and the third plate are separated by a gap having a second thickness, and the third plate having disposed parallel to the principal plane thereof an array of circumferentially disposed permanent magnets with a principal axis of each magnet disposed in a radial direction of the plate with alternating polarity between each immediately adjacent magnet in the array,
   b) wherein a portion of the first plate is disposed within the gap between the second and third plates and the second thickness of the gap is greater than the first thickness of the first plate so that the first plate does not contact the second and third plates.

4. The fluid flow power generation system according to claim 1 wherein the first conductive plate has a non-magnetic conductive skin and a ferromagnetic core.

5. The fluid flow power generation system according to claim 1
   wherein the first conductive plate has a non-magnetic skin formed of aluminum and a ferromagnetic core.

6. The fluid flow power generation system according to claim 5 wherein the ferromagnetic core of the first conductive plate is formed of a coiled metal bar having an electrically insulating layer on at least one surface to preclude circulating current flow transverse to the coiled bar within the ferromagnetic core.

7. The fluid flow power generation system according to claim 4 wherein the conductive skin has a total thickness of about 0.25 inches (6 mm) and the ferromagnetic core has a thickness of about 0.5 inches (12 mm).

8. The fluid flow power generation system according to claim 3 wherein the first conductive plate has a larger diameter than the second and third plates.

9. The fluid flow power generation system according to claim 1 further comprising a sensing means and circuit operative to disconnect the EDM from the electric power grid when the turbine blade assembly is rotating too slowly to generate more power than is consumed by energizing the EDM to rotate at the constant speed.

10. The fluid flow power generation system according to claim 1 wherein at least one of the first and second plates is supported at least partially by magnetic bearings.

11. The fluid flow power generation system according to claim 1 wherein the fluid driven rotary turbine blade assembly is a Vertical Axis Wind Turbine (VAWT).

12. The fluid flow power generation system according to claim 2 wherein the first plate has a larger diameter than the second plate.

13. The fluid flow power generation system according to claim 1 further comprising a mechanical transmission disposed to form the rotary coupling between the first rotary shaft and the rotary turbine blade assembly.

14. A fluid flow power generation system comprising:
  a) a fluid driven rotary turbine blade assembly,
  b) a first rotary shaft having a rotary coupling to said rotary turbine blade assembly,
  c) a first electrically conductive cylinder co-axially coupled to said first rotary shaft,
  d) an electric dynamo machine (EDM) having a rotary axle, wherein the EDM is energized by an electric power grid to run at a constant rotary speed,
  e) a second cylinder coupled to rotate about a cylindrical axis thereof to said rotary axle, the second cylinder having disposed parallel to a surface thereof one or more ring-like arrays of permanent magnets, each magnet in the one or more arrays having a north and a south pole of which each magnet has one of the north pole and the south pole oriented about the surface of the second cylinder, wherein for each of the magnets in the arrays the north and south poles are at an opposite radial orientation with respect to an immediately adjacent magnet in the array,
  f) wherein the first electrically conductive cylinder and the second cylinder are disposed with surfaces spaced apart but with at least a portion of the surfaces adjacent to each other such that when an increased differential speed of rotation of the first and second rotary shafts results in an increased phase lead from a grid frequency the EDM is operative to send power back to the electric power grid.

15. The fluid flow power generation system according to claim 14 wherein one of the first and second cylinders is disposed concentrically within at least a portion of the other cylinder.

16. The fluid flow power generation system according to claim 14 wherein the first rotary shaft and the rotary axle of the EDM are laterally offset.

17. The fluid flow power generation system according to claim 14 wherein the first conductive cylinder has a ferromagnetic core and a non ferromagnetic conductive skin.

18. The fluid flow power generation system according to claim 17 wherein the ferromagnetic core is formed by a stack of ferromagnetic metal washer shaped rings, with an electrically insulating layer between each adjacent layer in the stack.

19. The fluid flow power generation system according to claim 17 wherein the non ferromagnetic skin is aluminum metal.

20. A method of electrical power generation, the method comprising:
  a) providing a fluid driven rotary turbine blade assembly having:
    i) a first rotary shaft having a rotary coupling to said rotary turbine blade assembly,
    ii) a first conductive rotating surface driven by the first rotary shaft;
  b) providing an electric dynamo machine (EDM) having a first rotary axle and an external array of permanent magnets of alternating polarity disposed on a second rotating surface driven by the first rotary axle,
  c) energizing the EDM from an electric power grid having a grid frequency and operative to rotate the first rotary axle at a constant rotary speed,
  d) wherein the first rotary shaft and the first rotary axle are oriented in a same direction so that the first conductive rotating surface and the second rotating surface are disposed adjacent to each other such that when an increased differential speed of rotation of the first rotary shaft and first rotary axle results in an increased phase lead from the grid frequency the EDM is operative to send power back to the electric power grid.

21. The method of electrical power generation according to claim 20 wherein a sensing means and circuit is operative to disconnect the EDM from the electric grid power when a rotation speed of the turbine blade assembly is insufficient to generate more power than is consumed by energizing the EDM to rotate at the constant rotary speed.

22. The method of electrical power generation according to claim 20 wherein at least one of the first conductive rotating surface and second rotating surface are disposed on at least one of a rotating disk and a rotating cylinder.

23. The method of electrical power generation according to claim 20 wherein at least one of the first conductive rotating surface and the second rotating surface is disposed on a rotating cylinder and the other rotating surface is disposed on an annulus that surrounds said rotating cylinder.

24. The method of claim 20 wherein the first conductive rotating surface has a ferromagnetic core and a non ferromagnetic conductive skin.

25. The method of claim 20 wherein the fluid driven rotary turbine blade assembly is driven by at least one of wind and liquid fluid.

* * * * *